United States Patent [19]

Shibano

[11] Patent Number: 5,156,422
[45] Date of Patent: Oct. 20, 1992

[54] SWIVEL JOINT

[75] Inventor: Yoshihide Shibano, Hiroshima, Japan

[73] Assignee: Kabushiki Kaisha Kobe Seiko Sho, Kobe, Japan

[21] Appl. No.: 820,788

[22] Filed: Jan. 15, 1992

Related U.S. Application Data

[63] Continuation of Ser. No. 510,849, Apr. 18, 1990, Pat. No. 5,104,154.

[30] Foreign Application Priority Data

Apr. 25, 1989 [JP] Japan .................................. 1-106961
Apr. 26, 1989 [JP] Japan .............................. 1-49775[U]

[51] Int. Cl.$^5$ ............................................. F16L 41/00
[52] U.S. Cl. .................................. 285/133.1; 285/136; 285/190; 285/422
[58] Field of Search ..................... 285/136, 134, 133.1, 285/190, 422, 13; 137/580

[56] References Cited

U.S. PATENT DOCUMENTS

| | | | |
|---|---|---|---|
| 1,891,670 | 12/1932 | Ernst | 285/136 |
| 2,187,147 | 1/1940 | Englesson | 285/136 |
| 2,781,134 | 2/1957 | Weir et al. | 285/136 X |
| 2,820,650 | 1/1958 | Leopold | 285/136 X |
| 3,477,746 | 11/1969 | Watson | |
| 3,913,616 | 10/1975 | Horsch | 137/580 |
| 3,923,133 | 12/1975 | Chivari | 137/580 X |
| 4,111,467 | 9/1978 | de Fremery | 285/136 |
| 4,195,741 | 4/1980 | Newman | 285/136 X |
| 4,683,391 | 8/1987 | Dubrosky | 137/580 |
| 4,781,404 | 11/1988 | Tharp et al. | 285/136 X |
| 4,790,699 | 12/1988 | Ringel | 137/580 X |

FOREIGN PATENT DOCUMENTS

| | | |
|---|---|---|
| 78105 | 12/1970 | Fed. Rep. of Germany . |
| 3734589 | 10/1987 | Fed. Rep. of Germany . |
| 8706674 | 11/1987 | World Int. Prop. O. . |

Primary Examiner—Randolph A. Reese
Assistant Examiner—Heather Chun
Attorney, Agent, or Firm—Oblon, Spivak, McClelland, Maier & Neustadt

[57] ABSTRACT

A swivel joint for the interconnection between pipes on an upper structure side and a lower structure side of a construction equipment of the upper structure revolving type. The swivel joint has formed therein a fluid passage for fuel supply oil to be supplied from a fuel oil tank on the lower structure side to an engine on the upper structure side and another fluid passage for return oil to be returned from the engine to the tank. The fluid passages are formed in an isolated condition from an other fluid passage so that fuel supply oil or return oil may not be mixed with any other fluid within the swivel joint or may not leak to the outer side of the swivel joint.

Another swivel joint is also disclosed wherein a body is divided in an axial direction into two parts. One the body parts is formed from a non-ferrous metal material having an anticorrosion property so that the body may not suffer from corrosion by fuel oil or air which contains water therein, and passages and annular grooves for fuel oil and air are formed in the anticorrosion body part.

3 Claims, 7 Drawing Sheets

SWIVEL JOINT

This is a continuation of application Ser. No. 07/510,849, filed on Apr. 18, 1990 now U.S. Pat. No. 5,104,154.

BACKGROUND OF THE INVENTION AND RELATED ART STATEMENT

This invention relates to a swivel joint for use with a construction equipment of the upper structure revolving type such as a wheel mounted shovel or a wheel crane for connecting fluid pipes to each other between lower structure and an upper structure.

The prior art will be described taking a wheel mounted shovel as an example of a construction equipment of the upper structure revolving type.

Referring to FIG. 4, a conventional wheel mounted shovel shown includes a lower structure 1 serving as a lower base and an upper structure 2 carried on the lower structure 1 by way of a pivotal bearing 3, and an engine 4, a tank 5 for working fluid to be supplied to hydraulic devices and a tank 6 for fuel oil to be supplied to the engine 4 are installed on the upper structure 2.

FIG. 5 shows a fuel oil circuit interconnecting the fuel oil tank 6 and the engine 4.

Fuel oil in the fuel oil tank 6 is supplied into a nozzle holder 9 by a feed pump 7 and an injection pump 8 as indicated by solid line arrow marks in FIG. 5. Meanwhile, return oil which overflows from the engine 4 is returned into the fuel oil tank 6 by way of a filter 10 as indicated by broken line arrow marks.

Additionally FIG. 6 shows a construction of a conventional swivel joint.

The swivel joint 11 shown includes a tubular body 12 and a cylindrical stem 13 fitted for rotation relative to each other around a common axis, and for example, the stem 13 is mounted as a rotary side member on the upper structure while the body 12 is mounted as a fixed side member on the lower structure.

The body 12 is divided in the direction of the axis thereof into two divisional parts including a first divisional body part 14 and a second divisional body part 15 in order to facilitate working and assembly of the swivel joint. The two body parts 14 and 15 are connected in an integrated relationship to each other by means of bolts 16.

A stem side air passage 17a and a stem side working oil passage 18a are provided in the stem 13.

Meanwhile, a pair of body side air and working oil passages 17c and 18c and a pair of body side annular grooves 17b and 18b are provided in the body 12. A pair of air and working oil passages 17 and 18 are thus provided which extend through the body 12 and the stem 13. A plurality of seal members 19 are provided on an inner periphery of the body 12.

Each of the passages 17 and 18 has an end connected to a corresponding pipe not shown on the upper structure 2 side and the other end connected to another corresponding pipe not shown on the lower structure 1 side such that the upper and lower pipes for air and the upper and lower pipes for working oil may be interconnected by way of the swivel joint 11.

It is to be noted that, while such passages 17 and 18 as described above are normally provided each by a plural number, only one of each of them is shown to facilitate illustration and description of the mechanism.

Such a wheel mounted shovel is disadvantageous in that, where the fuel tank 6 is mounted on the upper structure 2 as described above, it is located at an excessively high position, and consequently, a fuel oil supplying operation is cumbersome.

Thus, it may seem convenient to install the fuel oil tank 6 otherwise on the lower structure 1 as shown in FIG. 7 in order to facilitate such a fuel oil supplying operation.

In this instance, a fuel oil supplying pipe for supplying fuel oil from the fuel oil tank 6 to the engine 4 and a return oil pipe for returning return oil to the tank 6 are each divided into upper and lower portions similarly to any other pipe for other fluid such as air and working oil, and the upper and lower portions of the pipes are connected to each other by way of the swivel joint 11. In this instance, if the construction of the fuel oil passages of the conventional swivel joint 11 is employed as it is as passage construction for fuel oil, then this will give rise to the following problem.

In particular, in a swivel joint of the type mentioned, fluid is likely to leak from an annular groove at a junction between fluid passages of the body side and the stem side to a location between fitting faces of the body and stem, and this leaking fluid may be mixed with another leaking fluid or may leak to the outer side.

Accordingly, where such a construction is employed that fuel oil (fuel supply oil and return oil) is delivered between the body and the stem by way of an annular groove in the body similarly as for air and working oil, such other fluid as air or working oil may be mixed with the fuel oil thereby to deteriorate the combustion efficiency, or on the contrary, fluid oil may be mixed into some other fluid thereby to obstruct an original function of the fluid. Or there is a problem that fuel oil may leak to the outer side to bring about a dangerous condition.

SUMMARY OF THE INVENTION

It is an object of the present invention to provide a swivel joint which overcomes such a drawback as described above.

In order to attain the objects, according to one aspect of the present invention, there is provided a swivel joint for a construction equipment or the like wherein an upper structure on which an engine is carried is mounted for swinging movement on a lower structure on which a fuel oil tank is disposed, which comprises a body secured to one of the upper and lower structures, and a stem secured to the other of the upper and lower structures and fitted for relative rotation in an inner bore of the body around a common axis, the stem having a fuel oil supply passage formed therein along the axis thereof for supplying fuel oil from the fuel oil tank to the engine therethrough, the stem further having a stem side return oil passage formed therein which forms part of a return oil passage for returning fuel oil from the engine to the fuel oil tank, the body having a body side return oil passage formed therein, the body further having a return oil annular groove formed therein for communicating the body side return oil passage with the stem side return oil passage, the body further having a drain oil annular groove formed therein for catching return oil leaking from the return oil annular passage, the stem further having a drain oil passage formed therein for communicating the drain oil annular passage with the fuel oil tank.

With this swivel joint, since fuel supply oil is supplied toward the engine in an isolated condition from any other fluid by way of the fuel supply oil passage extending along the axis of the stem, there is no possibility that such fuel supply oil may be mixed with any other fluid or may leak to the outer side of the swivel joint.

Regarding the return oil, even if return oil leaks out from the return oil annular groove, it will be caught by the drain oil annular groove and returned into the tank by way of the drain oil passage. Consequently, return oil is prevented from mixing with any other fluid and from leaking to the outer side of the swivel joint similarly to fuel supply oil.

Further, where the passage for fuel supply oil in the swivel joint is constituted only from a single pipe member, maintenance of the fuel oil supply circuit such as inspection or repair can be performed readily.

A pair of such drain oil annular grooves may be formed at locations of the body on the opposite sides of the return oil annular groove in the axial direction so that, in case return oil leaks in either of the opposite directions of the axis from the return oil annular groove, it may be caught with certainty by the drain oil annular grooves.

Preferably, a seal member is disposed on an inner periphery of the body between the return oil annular groove and the drain oil annular groove or either one or each of the drain oil annular grooves. Thus, leakage of return oil is prevented by a sealing action of the seal member, and only return oil which passes the seal member is caught by the drain oil annular groove. Consequently, such a situation can be prevented that leaking return oil may not be caught by the drain oil annular groove and may reach an annular groove for any other fluid.

According to another aspect of the present invention, there is provided a swivel joint for construction equipment or the like wherein an upper structure on which an engine is carried is mounted for swinging movement on a lower structure on which a fuel oil tank is disposed, the swivel joint having several fluid passages formed therein which include an air passage and a fuel oil passage which interconnects the fuel oil tank and the engine, the swivel joint comprising a body secured to one of the upper and lower structures, and a stem secured to the other of the upper and lower structures and fitted for relative rotation in an inner bore of the body around a common axis, the body being composed of a plurality of divisional parts in the axial direction thereof, a particular one of the divisional parts being made of a non-ferrous metal material having an anticorrosion property, the anticorrosion divisional part of the body having formed therein body side passages and annular grooves for fuel oil and air which make part of the fuel oil passage and air passage, respectively.

One of the other causes of mixture of the different fluids with each other in a swivel joint and leakage of any fluid to the outer side of the swivel joint is damage to a seal member arising from corrosion of a body. In particular, fuel oil and air are originally inclined to accept water therein from the outside and besides have no anticorrosion property as distinct from working oil. Meanwhile, in the case of the conventional swivel joint 11 shown in FIG. 6, the two divisional parts 14 and 15 of the body 12 are both formed from an iron material which is likely to rust. Consequently, if the inner periphery of the body suffers from corrosion, then the seal members 19 provided there will be damages and thus deteriorate a sealing action thereof, which leads to a mixture of different fluids with each other or leakage of such fluids to the outer side of the swivel joint.

With the swivel joint of the construction according to the second aspect of the present invention described above, however, since corrosion of the inner periphery of the body by fuel oil or air which contains water therein can be prevented, possible damage to a seal member arising from corrosion of the inner periphery of the body as well as a mixture of different fluids with each other and leakage of such fluids to the outer side of the swivel joint which arise from such damage to the seal member can be prevented.

Preferably, the anticorrosion divisional part of the body has a drain oil annular groove formed on an inner periphery thereof for catching return oil leaking from the annular groove for fuel oil while the stem has a drain oil passage formed therein for communicating the drain oil annular groove with the fuel oil tank. Thus, fuel oil can be isolated from any other fluid and possible damage to the seal member arising from corrosion of the body can be prevented. Consequently, the prevention of the mixture of different fluids with each other and of leakage of such fluids to the outer side of the swivel joint is assured.

Such drain oil annular grooves may be formed in pairs at locations of the anticorrosion divisional part of the body on the opposite sides of the annular groove for fuel oil in the axial direction.

Preferably, a seal member is disposed on an inner periphery of the body between the annular groove for fuel oil and the drain oil annular groove or either one or each of the drain oil annular grooves.

The above and other objects, features and advantages of the present invention will become apparent from the following description and the appended claims, taken in conjunction with the accompanying drawings.

DETAILED DESCRIPTION OF A PREFERRED EMBODIMENT OF THE INVENTION

An embodiment of the present invention will be described with reference to FIGS. 1 to 3.

Figure 3:
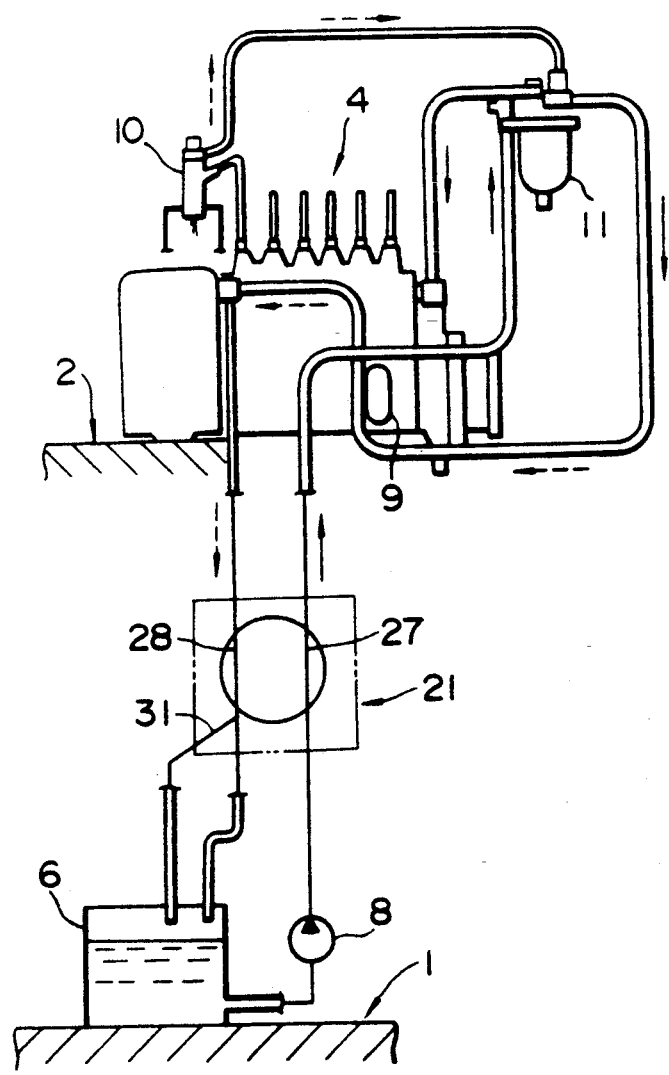
FIG. 3 is a circuit diagram showing general construction of a fuel oil circuit where the swivel joint of FIG. 1 is incorporated in a wheel mounted shovel.
Figure 4:
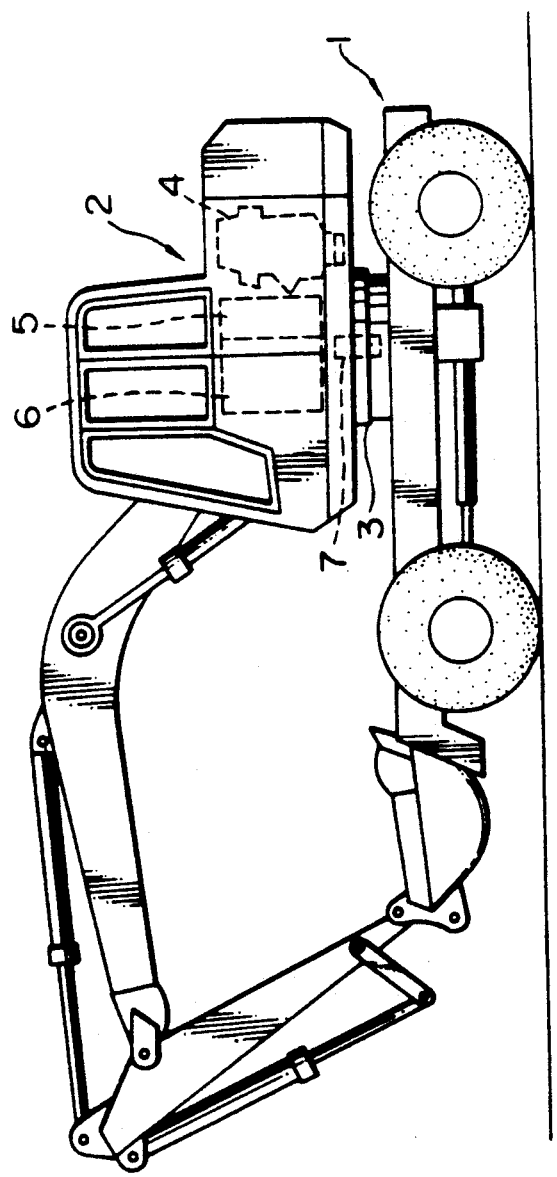
FIG. 4 is a schematic side elevational view of a wheel mounted shovel of the type wherein a fuel oil tank is mounted on an upper structure.

FIG. 3 shows a fuel oil circuit incorporated in a swivel joint 21 to which the present invention is applied.

Figure 5:
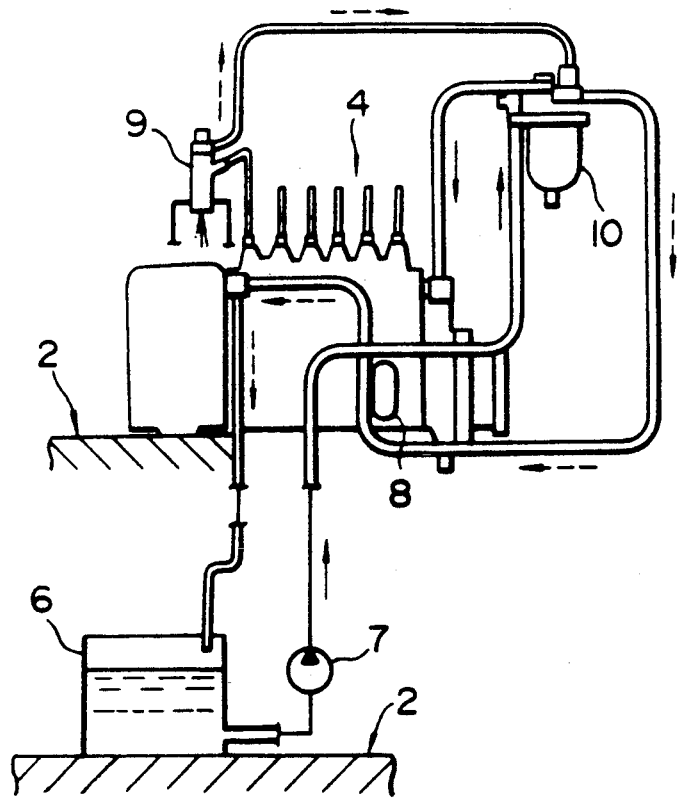
FIG. 5 is a circuit diagram showing general construction of a fuel oil circuit of the wheel mounted shovel shown in FIG. 4.

The fuel oil circuit has a somewhat similar construction to that of the fuel oil circuit shown in FIG. 5 and described hereinabove, and accordingly, only differences will be described here to avoid redundancy. In particular, upper and lower pipes for fuel supply oil and return oil are connected to each other by way of a fuel supply oil passage 27 and a return oil passage 28 formed in the swivel joint 21. A drain oil passage 31 for recovering an internal leak portion (drain oil) of return oil into a tank 6 is also provided in the swivel joint 21.

Figure 1:
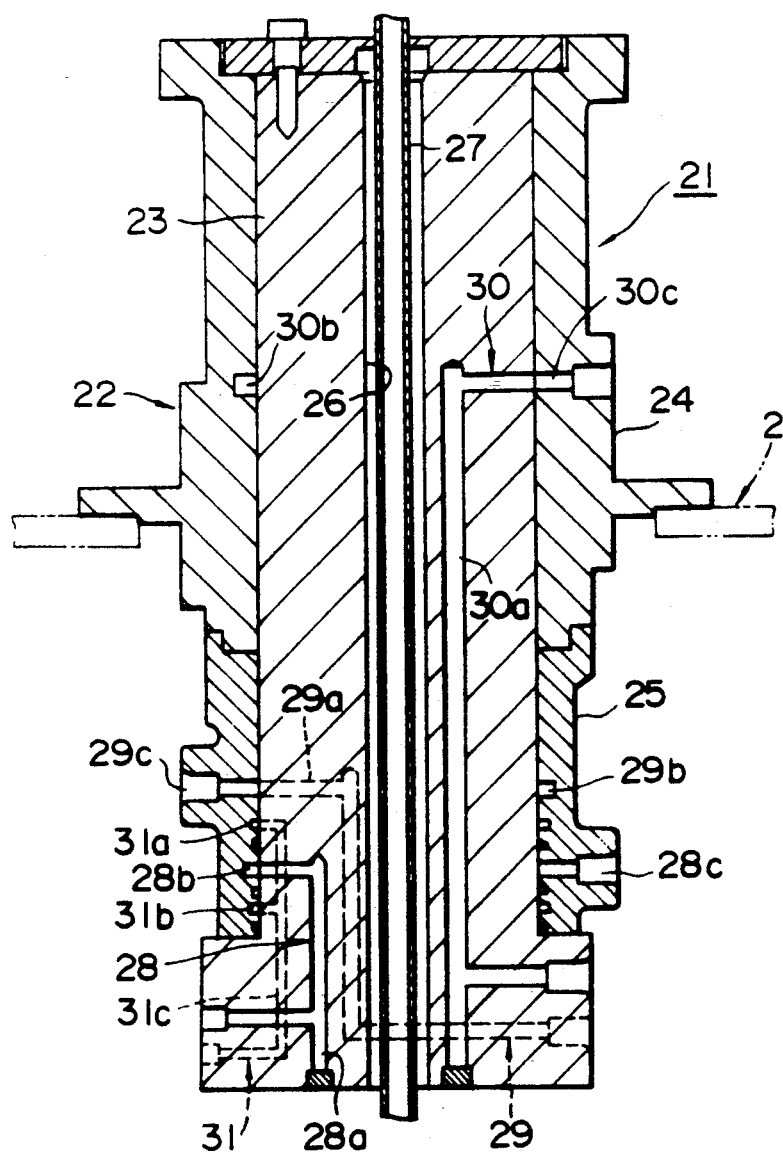
FIG. 1 is a vertical sectional view of an entire swivel joint showing a preferred embodiment of the present invention.
Figure 2:
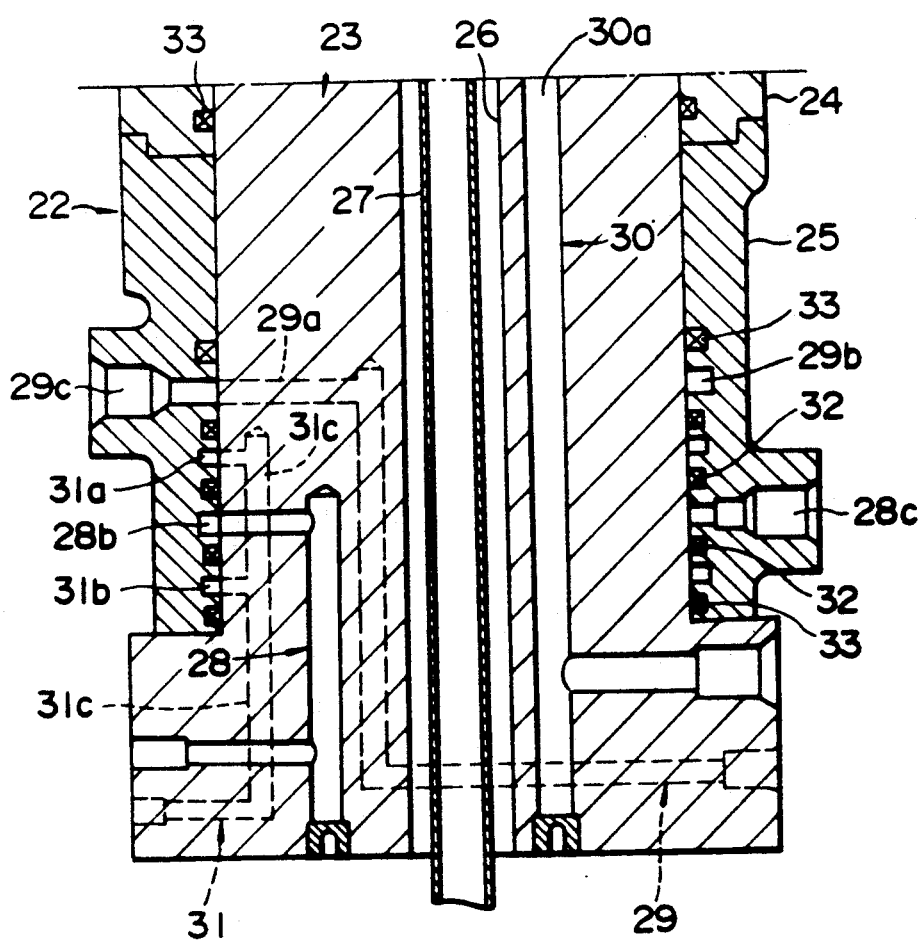
FIG. 2 is an enlarge sectional view of part of the swivel joint of FIG. 1.

Detailed construction of the swivel joint 21 is shown in FIGS. 1 and 2. Referring to FIGS. 1 and 2, the swivel joint 21 is composed of a body 22 and a stem 23.

Figure 6:
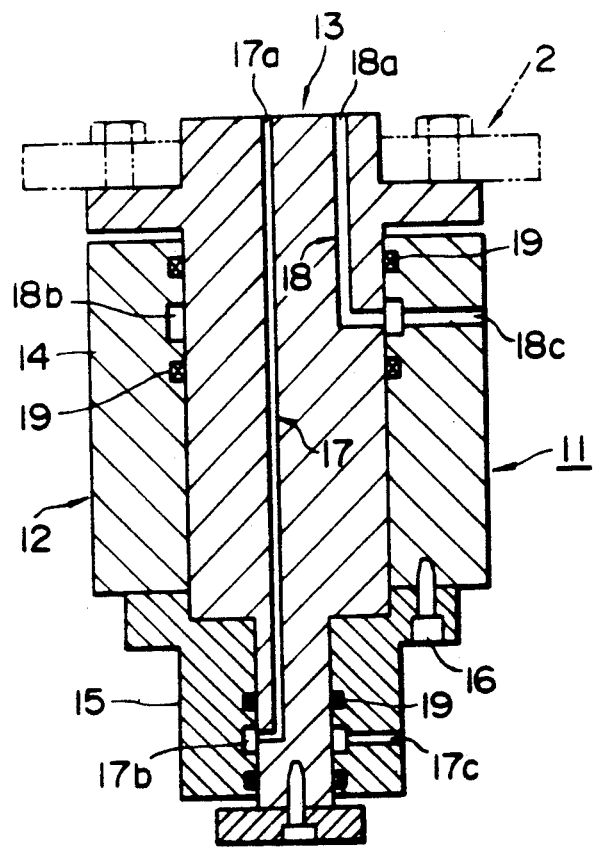
FIG. 6 is a vertical sectional view showing a conventional swivel joint.
Figure 7:
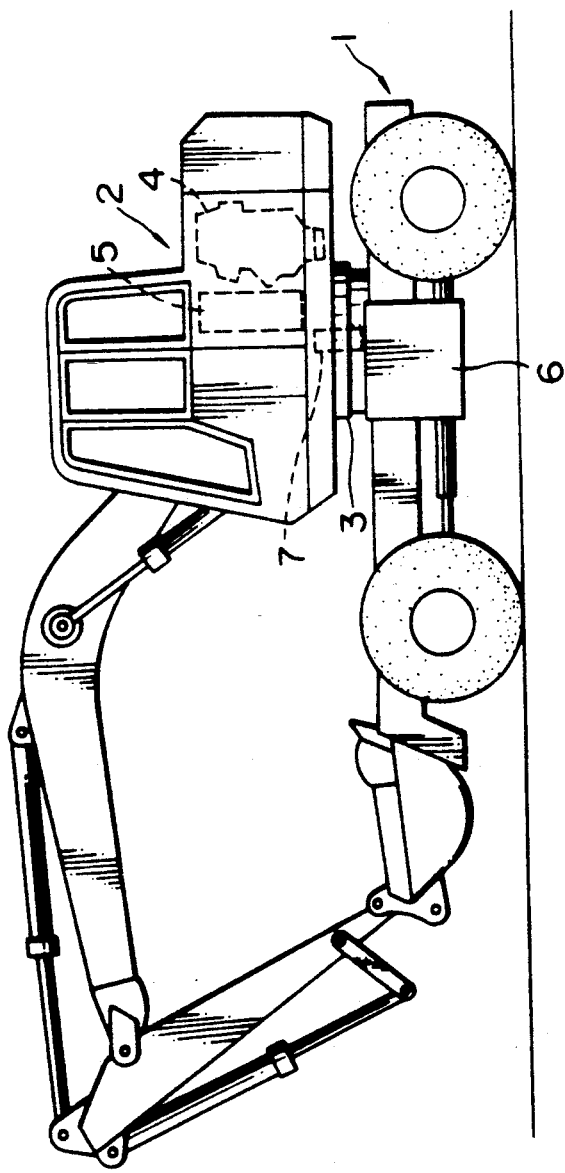
FIG. 7 is a schematic side elevational view of a wheel mounted shovel of another type wherein a fuel oil tank is mounted on a lower structure.

The body 22 is divided in a direction of an axis thereof into two divisional parts including a first divisional body part 24 and a second divisional body part 25 similarly to the conventional swivel joint 11 shown in FIG. 6 in order to facilitate working and assembly of the mechanism. The first divisional body part 24 is mounted on an upper structure 2 while the stem 23 is mounted on a lower structure (not shown).

The stem 23 has a through-hole 26 formed along an axis thereof, and a pipe member 27 serving as a fuel oil supply passage extends through the through-hole 26 of the stem 23. The pipe member 27 is connected at an upper end thereof to a fuel oil supply pipe not shown on the upper structure side and at a lower end thereof to another fuel oil supply pipe not shown on the lower structure side each by way of a rotary joint not shown so that fuel oil may be supplied from the fuel oil tank 6 of FIG. 3 to the engine 4 by way of the pipe member 27.

The stem 23 further has stem side fluid passages 28a, 29a and 30a formed therein for return oil, air and working oil, respectively.

Meanwhile, the first divisional body part 24 which constitutes part of the body 22 is formed from an iron material similarly as in the body of a conventional swivel joint while the second divisional body part 25 is formed from a non-ferrous metal material having an anticorrosion property such as aluminum.

A body side working oil passage 30c and a working oil annular groove 30b for the communication of the passage 30c with the stem side working oil passage 30a are formed in the first divisional body part 24 of the body 22 and generally constitute a working oil passage 30.

Meanwhile, a body side return oil passage 28c and a body side air passage 29c as well as a return oil annular groove 28b and an air annular passage 29b for the communication of the passages 28c and 29c with the corresponding stem side fluid passages 28a and 29a, respectively, are formed in the second divisional body part 25 of the body 22 and generally constitute a return oil passage 28 and a working oil passage 29, respectively.

Further, a pair of body side drain oil annular grooves 31a and 31b are formed at locations of an inner periphery of the second divisional body part 25 on the opposite sides of the return oil annular groove 28b in the axial direction (at the opposite upper and lower locations) while a pair of return oil leakage preventing seal members 32 (FIG. 2) are provided between the return oil annular groove 28b and the two drain oil annular grooves 31a and 31b.

Meanwhile, the stem 23 has a drain oil passage 31c formed therein for communicating the two drain oil annular grooves 31a and 31b with each other. The drain oil passage 31c is connected to the fuel oil tank 6 by way of a pipe not shown, and a drain oil passage 31 is constituted from the drain oil annular grooves 31a and 31b and the drain oil passage 31c.

A plurality of seal members 33 (FIG. 2) are provided at required locations of the inner periphery of the body 22 in addition to the seal member 32 for the prevention of return oil leakage.

In the swivel joint of the construction described above, fuel oil is supplied from the fuel oil tank 6 to the engine 4 by way of the pipe 27 in an isolated condition from any other fluid, and consequently, there is no possibility that such fuel supply oil may be mixed with any other fuel nor may leak to the outer side of the swivel joint.

On the other hand, return oil is returned to the fuel oil tank 6 by way of the return oil passage 28 extending through the body 22 and the stem 23 similarly to any other fluid.

In this instance, in case such an accident happens that return oil leaks out from the return oil annular groove 28b to a location between fitting faces of the second divisional body part 24 and the stem 23, the leakage oil will be prevented from axial permeation or dispersion in the axial direction by a sealing action of the seal members 32.

Additionally, since the drain oil annular grooves 31a and 31b are provided on the opposite sides of the return oil annular groove 28b in the axial direction, even if such return oil that leaks out from the return oil annular groove 28b passes either one of the seal members 32, it will be caught by a corresponding one of the drain oil annular grooves 31a and 31b and returned into the tank 6 by way of the drain oil passage 31.

On the other hand, since the second divisional body part 25 of the body 22 is formed from a non-ferrous metal material having an anticorrosion property and the annular grooves 28b and 29b and the passages 28c and 29c for return oil and air, respectively, are provided in the anticorrosion divisional body part 25, there is no possibility that the divisional body part 25, particularly inner periphery portions thereof at which the seal members 32 and 33 are provided, may suffer from corrosion by return fuel oil or air which contains water therein. Consequently, possible damage to the seal members 32 and 33 which may arise from corrosion of the divisional body part 25 is prevented.

It is to be noted that, since the inner periphery of the stem 23 is plated with suitable metal, no corrosion will appear on the inner periphery of the stem 23. Accordingly, there is no possibility that the seal members 32 or 33 may be damaged due to possible corrosion of the stem side.

Accordingly, with the swivel joint of the embodiment described above, in addition to the fact that fuel supply oil and return oil are fed in the swivel joint in an isolated condition from any other fluid, mixture of fluids with each other and leakage of any fluid to the outer side of the swivel joint can be prevented with certainty.

It is to be noted that, while it may seem convenient to form the first divisional body part 24 from a non-ferrous metal material having an anticorrosion property in order to prevent possible corrosion similarly to the second divisional body part 25, since normally the pressure of working oil is very high (350 kg/cm$^2$ or so) comparing with the pressure of fuel oil and air (normally 10 kg/cm$^2$ or less), it is desirable to form the first divisional body part 24 from a ferrous material having a high strength.

MODIFICATIONS (I) While the swivel joint of the embodiment described above has a combination of the construction wherein the passages for fuel supply oil and return oil are formed in an isolated condition from any other fluid passage and the construction wherein the body side fluid passages and annular grooves for return oil and air are provided on the anticorrosion divisional body part, since each of the constructions exhibits by itself a high effect for the prevention of mixture of different fluids or of external leakage of any fluid, only either one of the constructions may be employed.

(II) The drain oil annular passage of the present invention need not be provided on each side of the return oil annular groove in the axial direction as in the embodiment described above but may be provided, for example, where leakage of return oil occurs substantially only in a specific one of the opposite axial directions, only on the specific location.

(III) While, in the embodiment described above, the seal members are provided between the return oil annular groove and the drain oil annular grooves, even if the seal members are not provided, the swivel joint is still far more advantageous, due to presence of the drain oil annular grooves, with regard to the effect of prevention of mixture of fuel oil with any other fluid and prevention of external leakage of fuel oil, than a conventional swivel joint.

(IV) In the embodiment described above, the passage 28c and the annular groove 28b for return oil are provided on the anticorrosion divisional body part 25 while fuel supply oil is flowed along the pipe member 27 disposed in the through-hole 26 extending along the axis of the stem, the reverse construction may otherwise be employed wherein fuel supply oil is flowed by way of the passage 28c and the annular groove 28b of the anticorrosion body part 25 while return oil is flowed along the pipe member 27 in the through-hole 26 of the stem 23.

(V) While in the embodiment described above the swivel joint is described as applied to a wheel mounted shovel, the present invention can be applied to any swivel joint which is used in a working machine of the upper structure revolving type which is composed of a lower base and an upper revolving structure.

Having now fully described the invention, it will be apparent to one of ordinary skill in the art that many changes and modifications can be made thereto without departing from the spirit and scope of the invention as set forth herein.

What is claimed is:

1. A swivel joint for construction equipment or the like wherein an upper structure on which an engine is carried is mounted for swinging movement on a lower structure on which a fuel oil tank is disposed, said swivel joint having several fluid passages formed therein which include an air passage and a fuel oil passage which interconnects said fuel oil tank and said engine, said swivel joint comprising:
    a body secured to one of said upper and lower structures; and
    a stem secured to the other of said upper and lower structures and fitted for relative rotation with respect to said body in an inner bore of said body around a common axis;
    said body being composed of a plurality of divisional parts in the axial direction thereof, one of said divisional parts being made of an anticorrosive non-ferrous metal material and the other of said divisional parts being formed of a ferrous material, the anticorrosive divisional part of said body having formed thereon at least one body side passage and at least one annular groove for fuel oil and air which respectively comprise a part of said fuel oil passage and said air passage.

2. The swivel joint according to claim 1, wherein said anticorrosive divisional part of said body comprises first and second drain oil annular groove means for catching return oil leaking from said at least one annular groove for fuel oil, said first and second drain oil annular groove means each being located, with respect to an axial direction of said swivel joint, on opposite sides of said at least one annular groove for fuel oil and being formed on an inner periphery of said body, said stem comprising drain oil passage means for communicating said first and second drain oil annular groove means with said fuel oil tank, said drain oil passage means being formed in said stem in fluid communication with both said first and second drain oil annular groove means.

3. The swivel joint according to claim 2, further comprising:
    a first seal member disposed on an inner periphery of said anticorrosive divisional part of said body axially between said at least one annular groove for fuel oil and one of said first and second drain oil annular groove means; and
    a second seal member disposed on said inner periphery of said anticorrosive divisional part of said body axially between said at least one annular groove for fuel oil and the other of said first and second drain oil annular groove means.

* * * * *